(12) United States Patent
Wöll et al.

(10) Patent No.: US 6,280,826 B1
(45) Date of Patent: Aug. 28, 2001

(54) BULLETPROOF GLASS WINDOW FOR A MOTOR VEHICLE

(75) Inventors: Herwig Wöll, Sachsenheim; Siegfried Stranner, Müchen, both of (DE)

(73) Assignee: Isoclima GmbH, Munich (DE)

( * ) Notice: Subject to any disclaimer, the term of this patent is extended or adjusted under 35 U.S.C. 154(b) by 0 days.

(21) Appl. No.: 09/460,981

(22) Filed: Dec. 15, 1999

(30) Foreign Application Priority Data

Dec. 16, 1998 (DE) .............................. 198 58 082

(51) Int. Cl.⁷ ...................................... B32B 23/02
(52) U.S. Cl. .............................. 428/192; 428/14; 428/38; 428/46; 428/49; 428/426; 428/432; 428/433; 428/911; 296/84.1; 109/49.5
(58) Field of Search ................ 428/192, 38, 46, 428/426, 432, 433, 49, 213, 212, 332, 423.1, 911, 913; 296/84.1; 219/522; 109/49.5

(56) References Cited

U.S. PATENT DOCUMENTS

| 4,277,294 | 7/1981 | Orcutt ................................. 156/102 |
| 4,817,347 | 4/1989 | Hand et al. . |

FOREIGN PATENT DOCUMENTS

| 36 39 781 | 6/1988 | (DE) . |
| 40 06 708 A1 | 9/1991 | (DE) . |
| 40 06 709 | 9/1991 | (DE) . |
| 92 05 520 | 9/1992 | (DE) . |
| 41 42 416 | 6/1993 | (DE) . |
| 93 10 957 | 11/1993 | (DE) . |
| 44 15 879 | 11/1995 | (DE) . |
| 42 36 233 | 4/1996 | (DE) . |
| 196 01 982 | 12/1996 | (DE) . |
| 195 39 607 | 4/1997 | (DE) . |
| 197 45 160 | 4/1998 | (DE) . |
| 197 11 459 | 9/1998 | (DE) . |
| 197 29 897 C1 | 10/1998 | (DE) . |
| 197 45 248 | 4/1999 | (DE) . |
| WO97/07377 | 2/1997 | (WO) . |

*Primary Examiner*—Deborah Jones
*Assistant Examiner*—Abraham Bahta
(74) *Attorney, Agent, or Firm*—Lowe Hauptman Gilman & Berner, LLP

(57) ABSTRACT

The present invention relates to a bulletproof glass window, in particular for use as a lowerable side window of a motor vehicle, with plural glass panes (1, 3, 5) arranged in layers and laminates (2, 4), with at least one laminate being positioned between two adjoining glass panes in each case, in order to join the two glass panes, with a grading or stepped portion that is formed at the edge of the bulletproof glass window and with a projection (8) for lodging the bulletproof glass window in a chassis (14) or door frame, and with a metal armoring which, in the area of the projection (8), at least covers the inner surface of the projection, in the area of the grading or stepped portion a recess (12) being formed on the face, and the metal armoring (6) extending into the recess (12).

8 Claims, 1 Drawing Sheet

BULLETPROOF GLASS WINDOW FOR A MOTOR VEHICLE

FIELD OF THE INVENTION

The present invention relates to a bulletproof glass window, in particular for use as a lowerable side window of a motor vehicle or car, with a sandwich structure of glass panes and with a reinforcement or metal armouring on the edge of the bulletproof glass window.

BACKGROUND OF THE INVENTION

Such a window pane made of bulletproof glass for a motor vehicle is known from the DE 41 42 416 A1. The known window pane comprises several glass panes in a sandwich structure, five in all, of which the two outer glass panes project beyond the other glass panes at the edge of the bulletproof glass window to form a grading on a face of the bulletproof glass window. An angled bulletproof element made of sheet steel or a metal armouring on the grading prevents projectiles that strike the edge or a marginal area of the bulletproof window at an unfavourable angle from penetrating the bulletproof window. However, major modifications are required as the chassis or the frame of the vehicle has to be adapted to accommodate the measures of the bulletproof glass window.

In DE 195 39 607 A1 a bulletproof glass window as a wind-screen is described, which is formed as a laminated glass pane made of five glass panes with laminates or laminations between them. One pane of glass projects beyond the other glass panes at the edge of the bulletproof glass window to form a step or portion jutting out or a projection. With the projection, the known bulletproof glass window lodges and engages into the opening or groove of a chassis or door frame when the bulletproof glass window, for instance, is power-driven upwards in a motor vehicle to close the window. In this case no additional modification of the motor vehicle chassis is necessary, but in the event of a gun-fire attack against the edge of the known bulletproof glass window the bullet can, however, enter the interior of the motor vehicle because the projection alone is not sufficient to withstand a bullet. In the event of a blow or stroke with a blunt instrument or a shock wave, the projection can break or burst and the glass pane can fall inwards.

In DE 197 45 248 a bulletproof glass window with a metal insert is described, which shows a construction with four laminated glass panes in a multilayered structure. The outer glass pane projects above the other glass panes to provide a projection as the holding device for the bulletproof glass window on, for instance, a chassis. The inner surface of the projection is covered entirely with a metal insert as reinforcement. The faces of the glass panes positioned further inside form a flush surface, the face of the recessed glass pane adjoining the outer pane borders flush with the metal insert at a transitional region. A violent blow on the outside of the glass pane or a shock wave of an explosion, or something similar, can cause the outer glass pane to break at a point that adjoins the above-mentioned transitional region. In unfortunate circumstances a circumferential break can occur at this point around the entire frame if a violent blow is struck against the bulletproof glass window from outside; this can cause the glass pane to fall into the interior of the motor vehicle.

SUMMARY OF THE INVENTION

The object of the present invention is to exclude this risk of breakage on the edge of the bulletproof glass window.

This problem is solved by the bulletproof glass window of the invention which has, in particular for use as a lowerable side window of a motor vehicle, several glass panes in a sandwich structure, e.g. made of bulletproof glass and composite material, at least one layer of composite material being positioned between two adjoining glass panes, in order to join the two panes, a grading or stepped portion formed at the edge of the bulletproof glass window and having a projection to enable the bulletproof glass window to lodge or engage into a chassis or door frame, and a reinforcement or metal armouring that covers at least the inner surface of the projection or the surface of the projection that faces inwards, a recess being formed on the face of the grading or stepped portion, and the reinforcement or metal armouring extending into said recess.

The bulletproof glass window of this invention has the considerable advantage that the weak spot or location of the projection at the transitional region between metal armouring and glass extends within the groove, and is consequently enclosed or rather covered and supported on the inside and the outside by the sides of the recess or the adjoining glass or the adjoining or bordering glass panes; thus avoiding a breakage or severance of the projection at the weak spot. Therefore, due to this invention, it can be avoided that the bulletproof glass window falls into the interior of the motor vehicle as a result of a blow or other impact being delivered from outside the vehicle. Moreover, due to the metal armouring of the bulletproof glass window according to the invention, a projectile that strikes the marginal area of the glass pane will definitely be prevented from penetrating the interior of the motor vehicle. The bulletproof glass window of the invention thus makes it possible to provide optimal protection for the passengers in the vehicle, although the bulletproof glass window is only held in a standard motor vehicle chassis or door frame by a relatively narrow projection on its marginal area, without necessitating a costly and complicated modification of the motor vehicle, which considerably facilitates light armour-plating or heavy armour-plating of a motor vehicle, even if refitted at a later date.

A preferred embodiment of the bulletproof glass window according to the invention has at least one outer glass pane, at least one inner glass pane, and at least one middle glass pane that is positioned between the outer and the inner glass panes, the outer glass pane jutting out over the other glass panes to form the projection, and the inner glass pane jutting out beyond the middle glass pane at the area of the projection to form the recess for the reinforcement or the metal armouring between the inner glass pane and the outer glass pane. As the inner glass pane juts out over the middle glass pane it overlaps the weak region or spot between the metal armouring and the middle glass pane and reliably prevents a severance of the projection in the area of the weak spot. This preferred construction of the bulletproof glass window according to the invention can be produced simply as the recess is formed simply by using a middle glass pane that is comparatively shorter than the inner glass pane.

The metal armouring or metal insert is preferably fixed by means of a polyurethane layer on the adjoining glass pane or on the outer glass pane. The use of polyurethane as a laminate or composite material between the metal armouring and the surface of the glass provides a particularly long-lasting and stable composite.

The metal armouring can border flush with the face of the middle glass pane, which simplifies the manufacture of the bulletproof glass window according to the invention.

The metal armouring can be formed as a flat strip, or as a flat frame circumferentially extending along the edge of the bulletproof glass window, or as a frame section, which further simplifies the manufacture and enables a complete reinforcement without any weak points. The metal armouring can, however, for instance also be designed as an angled element and enclose or cover a larger area of the grading or stepped portion.

The thickness of the metal armouring can be less than the inside or internal width of the recess to provide for, e.g. a void or hollow space within the recess to accommodate process tolerance or varying thermal expansion of the metal armouring and the glass.

Preferably such a hollow space between the metal armouring and the adjoining glass pane and/or between metal armouring and the adjoining laminates and glass panes or composite layers within the recess is filled with a sealant or sealing in order to protect the edges and faces of the laminates and transitions or junctions between layers that would otherwise be exposed to harmful elements and corrosion.

Further advantageous embodiments of the present invention are mentioned in the dependent claims.

Further advantages, advantageous embodiments and possibilities of application of the present invention are provided in the following description of a preferred embodiment of the subject matter of the invention in connection with the single drawing.

DESCRIPTION OF THE PREFERRED EMBODIMENT

Figure 1:
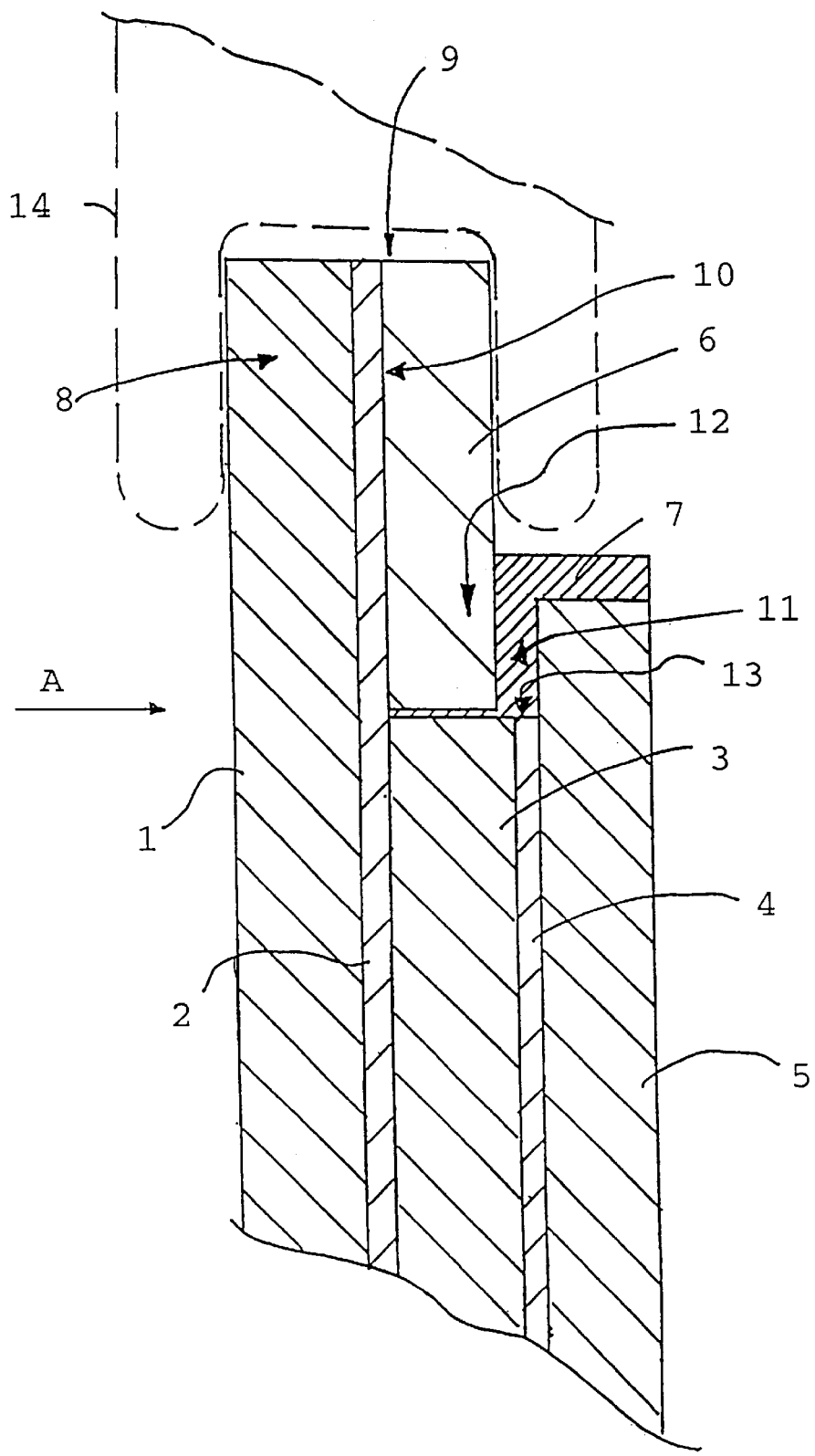
FIG. 1 is a partial cross section view of a preferred embodiment of the subject matter of the present invention, with a frame of the vehicle indicated by a dotted line.

FIG. 1 shows a preferred embodiment of the bulletproof glass window according to the invention that is formed as laminated glass and comprises several glass panes 1, 3 and 5 and a metal armouring 6. Below, the embodiment of the invention shown in FIG. 1 is explained in detail with reference, and by way of an example, to the use of the bulletproof glass window according to the invention as a lowerable side window of a motor vehicle.

The bulletproof glass window according to the invention comprises several glass panes 1, 3 and 5 that are arranged in a sandwich or laminated construction, with the inner glass pane 5 being positioned towards the interior of the motor vehicle, the outer glass pane 1 being positioned towards the exterior of the motor vehicle, and the middle glass pane 3 being positioned between the outer glass pane 1 and the inner glass pane 5, the inner glass pane 5 may be thicker than the other glass panes.

The exterior of the motor vehicle is marked by means of arrow A in FIG. 1, the arrow pointing at the outer glass pane. A layer of polyurethane 2 extends between the outer glass pane 1 and the middle glass pane 3, and forms a compound or composite between the outer glass pane 1 and the middle glass pane 3. The polyurethane layer 2 or the polyurethane film or foil are identical in shape and area with the outer glass pane 1. For instance, there is an additional layer of polyurethane 4 between the middle glass pane 3 and the inner glass pane 5 that also establishes a firm composite between the middle glass pane 3 and the inner glass pane 5. The layer of polyurethane 4 is identical in area with the adjoining surface of the middle glass pane 3.

The outer glass pane 1 juts out over the other two glass panes 3 and 5 at the edge of the shown bulletproof glass window with a projection 8, which forms a grading or stepped portion towards the other glass panes 3 and 5 on the face or edge of the bulletproof glass window. In the area of the projection 8, on the inwardly-facing surface 10 of the polyurethane layer 2, the metal armouring 6, made for example of sheet steel, is mounted on surface 10, which faces inward, and this metal armouring can be formed as a metal frame that is arranged at the edge of the bulletproof glass window, forming a firm compound or composite with the outer glass pane 1 by means of the polyurethane layer 2. On a face 9 of the bulletproof glass window or on the face of the projection 8, the outer glass pane 1, the polyurethane layer 2 and the metal armouring 6 are flush. The metal armouring 6 has a rectangular cross section. The projection 8 with the metal armouring 6 is held in a frame 14 of the motor vehicle, which is indicated in a cross section by a dotted line in FIG. 1 and which extends in the roof area of the motor vehicle. In the position shown in FIG. 1, the bulletproof glass window engages into the frame 14 with the projection 8. The shown side pane is thus raised and the window is closed.

The inner glass pane 5 juts out above the middle glass pane 3 in the area of the grading of the shown bulletproof glass window, whereby a recess 12, or rather groove or opening is formed in the area between the inner glass pane 5, the middle glass pane 3, which is flush with the polyurethane layer 4 on the face, and the polyurethane layer 2. The metal armouring 6 extends into the recess 12 and borders similar as a butt joint on the face of the middle glass pane 3, wherein a gap or a distance is provided between the face of the metal armouring 6 and the middle glass pane 3 being opposite to each other within the recess 12. On the face, the inner glass pane 5 is fitted with a sealing 7 e.g. made of polyurethane, which also fills or seals hollow spaces 11, including the gap between the opposite faces of the metal armouring 6 and the middle glass pane 3, within the recess 12 between the bordering surfaces of the metal armouring 6, the middle glass pane 3, the polyurethane layer 4—or the base 13 of the recess 12—, the inner glass pane 5 and the polyurethane layer 2 within the recess 12.

In an exemplified bulletproof glass window of the invention, the thickness of the outer and the middle glass panes 1 and 3 is 4 mm respectively, the thickness of the inner glass pane 5 is 8 mm, the thickness of the polyurethane layers 2 and 4 is 1 mm respectively, and the thickness of the steel reinforcement 6 approximately 2.5 mm. On the inside or inner surface of the inner glass pane 5, an additional series of layers of polyurethane and polycarbonate, in this order, can be applied over the entire surface, the thickness of this additional polyurethane layer being approximately 1.9 mm, and the thickness of the polycarbonate layer being approximately 2.5 mm.

A severance of the projection 8 near or at the transitional region between the metal armouring 6 and the middle glass pane 3 is prevented by the overlapping form of the inner glass pane 5 as regards the surface of the metal armouring 6 that is facing it.

In the manufacture of the bulletproof glass window according to the invention that is shown in FIG. 1, the outer glass pane 1 and the middle glass pane 3 are first of all washed and dried on a transport production line. Subsequently, a sandwich construction is manufactured in a dustfree and air conditioned room. During this process a polyurethane film that is 1 mm thick—from a typical range of foil thickness between approximately 0.3 mm and 5 mm—is manually, semi-automatically or fully automatically put on and aligned over the entire area of the surface of the outer glass pane 1 that is facing, in such a way that the applied polyurethane film covers the entire inner surface of the glass pane 1. Afterwards, the middle glass pane 3 is laid on the polyurethane layer 2 and aligned in such a way that in the marginal area of the bulletproof glass window to be produced a uniform, circumferential grading or stepped portion is formed, or the outer glass pane 1 juts out in the marginal area over the middle glass pane 3 with a projecting section 8. On the exposed surface of the polyurethane film or the polyurethane layer 2, that runs circumferentially along the edge, a frame with a rectangular cross section that had either previously been made out of sheet steel or punched out of it, is now laid on as a metal armouring 6, the width of the sheet steel frame corresponding to the width of the frame-like exposed polyurethane layer 2, and this in turn being covered by the metal armouring 6. Between the butt joint of the adjoining faces of the middle glass pane 3 and the metal armouring 6, a thin strip of polyurethane film is inserted, which later forms part of the sealing 7. The function of the thin polyurethane strip is to counterbalance or to compensate movements between the metal armouring 6 and the bordering or rather adjoining glass pane 3, which arise due to different thermal expansion. In addition, the polyurethane strip is intended to counterbalance or to compensate a possible process tolerance of the metal armouring 6 and the glass pane 3 in the transitional area between the metal armouring 6 and the middle glass pane 3.

From the thus prepared sandwich construction a pre-laminate is subsequently produced with partial plasticized films by heating and pressing in a so-called pre-laminate oven, the position of the metal armouring 6 being observed by means of suitable spacers. In the course of preparatory treatment, the enclosed air is almost completely pressed out of the sandwich construction.

Afterwards the sandwich structure that has been pre-treated in this way is placed in an autoclave. In this autoclave, precisely defined pressure and temperature cycles are created and the single components of the pre-treated sandwich construction are bonded together. During the autoclave cycle the interior of the autoclave is first heated to a temperature between 120° and 150° C., preferably 130° C. under pressure of 12 to 15 bar, preferably 14 bar. Once the set points for pressure and temperature have been reached, they are maintained over a holding time in the autoclave. Afterwards the temperature is first reduced in the autoclave and then the pressure, and the sandwich construction that has been treated in this way is removed.

In the next step, a polyurethane film, as polyurethane layer 4, is laid and aligned over the entire area of the now exposed surface of the middle glass pane 3. Onto this aligned polyurethane film, the previously cleaned inner glass pane 5 is subsequently laid and aligned in such a way that the inner glass pane 5 juts out over the face of the middle glass pane 3 and partially overlaps the metal armouring 6, as can be seen in FIG. 1. As the inner glass pane 5 juts out beyond the middle glass pane 3 at the face, a recess 12 is thus formed between the outer glass pane 1 and the inner glass pane 5, into which the metal armouring 6 extends. Next an angle piece of polyurethane film is placed on the face of the inner glass pane 5, a side or leg of the angle piece catching in the recess 12 and the other side or leg covering completely the face of the inner glass pane 5. After completion the bulletproof glass window according to the invention, the angled polyurethane strip seals the spaces 11 within the recess 12 and the face of the inner glass pane 5, and thus forms part of the sealing 7.

The thus prepared sandwich construction is now heated and pressed again in a pre-laminate oven in order to press out almost completely air that is in and around the polyurethane layer 4 and the sealant 7, and to obtain a partial plasticization of the polyurethane film of the polyurethane layer 4, and of the polyurethane material of the sealing 7. The prelaminated glass pane thus obtained is then treated again in an autoclave, the previously-explained pressure and temperature cycle being carried out again in order to obtain a durable and firm joining of the whole pre-laminated glass pane.

Basic manufacturing methods of laminated glass panes or bullet-proof glass windows are explained e.g. in the DE 197 45 160 A1 with the title "Verfahren und Vorrichtung zur Herstel-lung von Verbundsicherheitsglas" (Method and apparatus of the manufacture of laminated safety glass), and the unexamined laid-open patent application DE 197 114 59 A1 under the title "Verfahren zur Herstellung einer gebogenen Verbundsicher-heitsglasscheibe" (Method of the manufacture of a curved laminated safety glass pane), these are also referred to.

In other embodiments, the bulletproof glass window according to the invention can comprise several outer glass panes and/or several middle glass panes and/or several inner glass panes.

What is claimed is:

1. A bulletproof glass window for use in a motor vehicle, comprising;
   at least one outer glass pane, at least one inner glass pane and at least one middle glass pane being arranged between the outer glass pane and the inner glass pane, and a laminate being arranged between at least two adjoining ones of said outer, middle and inner glass panes and joining the two adjoining glass panes;
   wherein the outer glass pane juts beyond the other glass panes to form a stepped portion in the form of a projection for lodging the bulletproof glass window in a frame of the motor vehicle, wherein the inner glass pane juts out beyond the middle glass pane to form a recess between the inner glass pane and the outer glass pane within the stepped portion; and
   a reinforcement armouring covering at least an inner surface of the projection, wherein the reinforcement armouring extends into the recess.

2. The bulletproof glass window of claim 1, wherein the reinforcement armouring is metal fitted to the outer glass pane with a polyurethane layer.

3. The bulletproof glass window of claim 1, wherein the armouring is metal facing a face of the middle glass pane within the recess.

4. The bulletproof glass window of claim 1, wherein the armouring is selected from the group consisting of a flat metal strip, a flat circumferential metal frame, and a frame section located along an edge of the bulletproof glass window.

5. The bulletproof glass window according to claim 1, wherein the thickness of the armouring is less than an inner width of the recess.

6. The bulletproof glass window according to claim 1, wherein a hollow space between at least one of the (1) armouring and the adjoining glass panes and (2) the armouring and an adjoining laminate within the recess is filled by means of a sealing.

7. The bulletproof glass window according to claim 6, wherein said sealing is polyurethane.

8. The bulletproof glass window according to claim 1, wherein the bulletproof glass window is a lowerable or moveable side window of the vehicle.

* * * * *